US011279622B2

(12) United States Patent
Kim et al.

(10) Patent No.: US 11,279,622 B2
(45) Date of Patent: Mar. 22, 2022

(54) METHOD FOR PRODUCING SILICA AEROGEL AND SILICA AEROGEL PRODUCED THEREBY

(71) Applicant: LG Chem, Ltd., Seoul (KR)

(72) Inventors: Young Hun Kim, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 379 days.

(21) Appl. No.: 16/069,677

(22) PCT Filed: Sep. 12, 2017

(86) PCT No.: PCT/KR2017/010004
§ 371 (c)(1),
(2) Date: Jul. 12, 2018

(87) PCT Pub. No.: WO2018/048289
PCT Pub. Date: Mar. 15, 2018

(65) Prior Publication Data
US 2019/0194027 A1   Jun. 27, 2019

(30) Foreign Application Priority Data

Sep. 12, 2016 (KR) .................. 10-2016-0117519
Sep. 11, 2017 (KR) .................. 10-2017-0115904

(51) Int. Cl.
| | | |
|---|---|---|
| C01B 33/158 | (2006.01) | |
| C01B 33/145 | (2006.01) | |
| C01B 33/154 | (2006.01) | |
| C01B 33/155 | (2006.01) | |
| C01B 33/157 | (2006.01) | |

(52) U.S. Cl.
CPC ........ *C01B 33/1585* (2013.01); *C01B 33/145* (2013.01); *C01B 33/154* (2013.01); *C01B 33/155* (2013.01); *C01B 33/157* (2013.01)

(58) Field of Classification Search
CPC ... C01B 33/00; C01B 33/154; C01B 33/1585; C01B 33/145; C01B 33/157; C01B 33/155; C01B 33/18; C01B 33/181; B01J 13/0091; B01J 13/00; B01J 13/0082; B01J 13/0056; C04B 14/064; C04B 14/04; C08J 2205/026; B32B 2266/12; B32B 2266/126; C01P 2006/10; C01P 2006/11; C01P 2006/12; C01P 2006/14; C01P 2006/16
See application file for complete search history.

(56) References Cited

U.S. PATENT DOCUMENTS

| | | |
|---|---|---|
| 3,131,072 A | 4/1964 | Taulli |
| 3,895,087 A | 7/1975 | Ottinger et al. |
| 5,705,535 A | 1/1998 | Jansen et al. |
| 5,789,075 A | 8/1998 | Frank et al. |
| 5,789,495 A | 8/1998 | Burns et al. |
| 5,811,031 A | 9/1998 | Jansen et al. |
| 5,955,140 A | 9/1999 | Smith et al. |
| 5,962,539 A | 10/1999 | Perrut et al. |
| 6,068,882 A | 5/2000 | Ryu |
| 6,197,270 B1 | 3/2001 | Sonoda et al. |
| 6,319,852 B1 | 11/2001 | Smith et al. |
| 6,989,123 B2 | 1/2006 | Lee et al. |
| 7,399,439 B2 | 7/2008 | Lee et al. |
| 7,736,611 B2 | 6/2010 | Norberg et al. |
| 7,780,890 B2 | 8/2010 | Lee et al. |
| 7,897,648 B2 | 3/2011 | Halimaton |
| 8,137,651 B2 | 3/2012 | Yeo |
| 9,834,446 B2 | 12/2017 | Kim et al. |
| 9,862,614 B2 | 1/2018 | Oh et al. |
| 10,294,111 B2 | 5/2019 | Kim et al. |
| 10,336,621 B2 | 7/2019 | Kim et al. |
| 2001/0034375 A1 | 10/2001 | Schwertfeger et al. |
| 2002/0092938 A1 | 7/2002 | Huang |
| 2002/0094426 A1 | 7/2002 | Stepanian et al. |
| 2004/0029982 A1 | 2/2004 | Erkey et al. |
| 2004/0120876 A1 | 6/2004 | Meyer et al. |
| 2005/0046086 A1 | 3/2005 | Lee et al. |

(Continued)

FOREIGN PATENT DOCUMENTS

| | | |
|---|---|---|
| CN | 1164222 | 11/1997 |
| CN | 1241952 | 1/2000 |

(Continued)

OTHER PUBLICATIONS

Aravind et al, "Mesoporous silica-alumina aerogels with high thermal pore stability through hybrid sol-gel route followed by subcritical drying," Microporous and Mesoporous Materials 96: 14-20 (2006).
Aravind et al, "Nonsupercritically Dried Silica-Alumina Aerogels-Effect of Gelation pH," Journal of American Ceramic Society 91(4): 1326-1328 (2008).
Aravind et al., "Ambient pressure drying: a successful approach for the preparation of silica and silica based mixed oxide aerogels," Journal of Sol-Gel Science and Technology, 54: 105-117 (2010).
Kartal and Erkey, "Surface modification of silica aerogels by hexamethyldisilazane-carbon dioxide mixtures and their phase behavior," Journal of Supercritical Fluids 53: 115-120 (2010).

(Continued)

*Primary Examiner* — Smita S Patel
(74) *Attorney, Agent, or Firm* — Morgan, Lewis & Bockius LLP

(57) ABSTRACT

The present invention relates to a method for producing a silica aerogel and a silica aerogel produced thereby. The present invention provides a two-step process of a nucleation step of forming silica colloid particles by using a low-concentration silica precursor and a growth step of further adding a relatively high-concentration silica precursor to form a silica wet gel by using the silica colloid particles as a seed. Thus, the present invention provides a method for producing a silica aerogel of which mechanical stability is improved to enhance pore characteristics, and physical properties are readily controllable, and also provides a silica aerogel produced thereby.

15 Claims, No Drawings

(56) References Cited

U.S. PATENT DOCUMENTS

| | | |
|---|---|---|
| 2005/0167891 A1 | 8/2005 | Lee et al. |
| 2005/0192366 A1 | 9/2005 | Ou et al. |
| 2005/0192367 A1 | 9/2005 | Ou et al. |
| 2006/0032953 A1 | 2/2006 | Kruse |
| 2006/0125158 A1 | 6/2006 | Rouanet et al. |
| 2006/0199455 A1 | 9/2006 | Stepanian et al. |
| 2006/0286813 A1 | 12/2006 | Meredith et al. |
| 2007/0148435 A1 | 6/2007 | Meredith et al. |
| 2007/0154379 A1 | 7/2007 | Nakanishi et al. |
| 2008/0034968 A1 | 2/2008 | Nordberg et al. |
| 2008/0069753 A1 | 3/2008 | Floess et al. |
| 2008/0070146 A1 | 3/2008 | Fomitchev et al. |
| 2008/0081014 A1 | 4/2008 | Ahn et al. |
| 2008/0093016 A1 | 4/2008 | Lee et al. |
| 2008/0292889 A1 | 11/2008 | Harvey et al. |
| 2008/0311398 A1 | 12/2008 | Bauer et al. |
| 2009/0229032 A1 | 9/2009 | Stepanian et al. |
| 2009/0247655 A1 | 10/2009 | Kim et al. |
| 2010/0119432 A1 | 5/2010 | Yeo |
| 2010/0172815 A1 | 7/2010 | Park et al. |
| 2010/0204355 A1 | 8/2010 | Leventis et al. |
| 2010/0247897 A1 | 9/2010 | Leventis et al. |
| 2011/0000370 A1 | 1/2011 | Norberg et al. |
| 2011/0223329 A1 | 9/2011 | Meredith et al. |
| 2011/0240907 A1 | 10/2011 | Sharma et al. |
| 2011/0243837 A1 | 10/2011 | Shan et al. |
| 2012/0025127 A1 | 2/2012 | Yeo et al. |
| 2012/0171488 A1 | 7/2012 | Yeo et al. |
| 2012/0225003 A1 | 9/2012 | Joung et al. |
| 2012/0244040 A1 | 9/2012 | Joung et al. |
| 2013/0106008 A1 | 5/2013 | Ahn et al. |
| 2013/189521 A1 | 7/2013 | Fukuju et al. |
| 2013/0296596 A1 | 11/2013 | Suh et al. |
| 2014/0183290 A1 | 7/2014 | Xiao |
| 2014/0273701 A1 | 9/2014 | Samanta et al. |
| 2014/0287641 A1 | 9/2014 | Steiner, III |
| 2014/0323589 A1 | 10/2014 | Lazar et al. |
| 2015/0065590 A1 | 3/2015 | Rhine et al. |
| 2015/0069156 A1 | 3/2015 | Lee |
| 2015/0225630 A1 | 8/2015 | Hosoi et al. |
| 2016/0115685 A1 | 4/2016 | Bonnardel et al. |
| 2016/0199849 A1 | 7/2016 | Wada |
| 2016/0258153 A1 | 9/2016 | Koebel et al. |
| 2016/0264427 A1 | 9/2016 | Oh et al. |
| 2016/0280557 A1 | 9/2016 | Kim et al. |
| 2017/0074449 A1 | 3/2017 | Rhine et al. |
| 2017/0305749 A1 | 10/2017 | Jeon et al. |
| 2017/0369326 A1* | 12/2017 | Kim .................... C01B 33/154 |
| 2018/0002181 A1 | 1/2018 | Kim et al. |
| 2018/0002182 A1 | 1/2018 | Jeon et al. |
| 2018/0010726 A1 | 1/2018 | Kim et al. |
| 2018/0193825 A1 | 7/2018 | Kim et al. |
| 2018/0194634 A1 | 7/2018 | Kang et al. |
| 2018/0208474 A1 | 7/2018 | Kim et al. |
| 2018/0305215 A1 | 10/2018 | Kim et al. |
| 2018/0370809 A1 | 12/2018 | Lee et al. |
| 2019/0062169 A1 | 2/2019 | Kim et al. |
| 2019/0135645 A1 | 5/2019 | Kim et al. |
| 2019/0194027 A1 | 6/2019 | Kim et al. |

FOREIGN PATENT DOCUMENTS

| | | |
|---|---|---|
| CN | 1749214 | 3/2006 |
| CN | 1839024 | 9/2006 |
| CN | 1888302 | 1/2007 |
| CN | 101132856 | 2/2008 |
| CN | 101450852 | 6/2009 |
| CN | 101517012 | 8/2009 |
| CN | 101646622 | 2/2010 |
| CN | 101691227 | 4/2010 |
| CN | 101844771 | 9/2010 |
| CN | 102317209 | 1/2012 |
| CN | 102557577 | 7/2012 |
| CN | 102674374 | 9/2012 |
| CN | 102951650 | 3/2013 |
| CN | 103118979 A | 5/2013 |
| CN | 103130231 | 6/2013 |
| CN | 103771428 | 5/2014 |
| CN | 103818912 | 5/2014 |
| CN | 104030301 | 9/2014 |
| CN | 104961135 A | 10/2015 |
| CN | 105377759 A | 3/2016 |
| DE | 19648798 | 6/1998 |
| EP | 2231789 B1 | 2/2012 |
| EP | 2722311 A2 | 4/2014 |
| EP | 2813338 A1 | 12/2014 |
| EP | 2927194 A1 | 10/2015 |
| EP | 2930147 A1 | 10/2015 |
| EP | 3216762 A1 | 9/2017 |
| EP | 3257812 A1 | 12/2017 |
| JP | H10-70121 | 3/1998 |
| JP | H10-236817 | 9/1998 |
| JP | H11-28353 | 2/1999 |
| JP | 2002-256170 | 9/2002 |
| JP | 2005-305336 | 11/2005 |
| JP | 2007-519780 | 7/2007 |
| JP | 2007-524528 | 8/2007 |
| JP | 2007-524739 | 8/2007 |
| JP | 2008-195851 | 8/2008 |
| JP | 2011-190551 | 9/2011 |
| JP | 2014-051643 | 3/2014 |
| JP | 2016-017255 | 2/2016 |
| KR | 10-1999-0009158 | 2/1999 |
| KR | 10-2000-0057244 | 9/2000 |
| KR | 10-0385829 | 10/2003 |
| KR | 10-0566390 | 3/2006 |
| KR | 10-2008-0084241 | 9/2008 |
| KR | 10-2008-0093772 | 10/2008 |
| KR | 10-0909732 | 7/2009 |
| KR | 10-2009-0115703 | 11/2009 |
| KR | 10-2010-0010350 | 2/2010 |
| KR | 10-2010-0041737 | 4/2010 |
| KR | 10-2010-0053350 | 5/2010 |
| KR | 10-2010-0090989 | 8/2010 |
| KR | 10-2010-0133268 | 12/2010 |
| KR | 10-2011-0082379 | 7/2011 |
| KR | 10-2011-0125773 | 11/2011 |
| KR | 10-2011-0126381 | 11/2011 |
| KR | 10-1082982 | 11/2011 |
| KR | 10-1105436 | 1/2012 |
| KR | 10-2012-0012836 | 2/2012 |
| KR | 10-2012-0030791 | 3/2012 |
| KR | 10-2012-0033159 | 4/2012 |
| KR | 10-1155431 | 6/2012 |
| KR | 10-2012-0070948 | 7/2012 |
| KR | 10-2012-0126741 | 11/2012 |
| KR | 10-1199958 | 11/2012 |
| KR | 10-2013-0051304 | 5/2013 |
| KR | 10-2013-0123942 | 11/2013 |
| KR | 10-2013-0128365 | 11/2013 |
| KR | 10-2014-0005177 | 1/2014 |
| KR | 10-2014-0050867 | 4/2014 |
| KR | 10-2014-0076022 | 6/2014 |
| KR | 10-2014-0146814 | 12/2014 |
| KR | 10-1506096 | 3/2015 |
| KR | 10-2015-0089319 | 8/2015 |
| KR | 10-2015-0090320 | 8/2015 |
| KR | 10-2015-0093062 | 8/2015 |
| KR | 10-2015-0093063 | 8/2015 |
| KR | 10-2015-0093122 | 8/2015 |
| KR | 10-2015-0093123 | 8/2015 |
| KR | 10-1789371 | 10/2017 |
| WO | 1996/006808 | 3/1996 |
| WO | 2005/003476 | 1/2005 |
| WO | 2005/110919 | 11/2005 |
| WO | 2008-038935 | 4/2008 |
| WO | 2008117995 | 10/2008 |
| WO | 2008/143384 | 11/2008 |
| WO | 2009/033065 | 3/2009 |
| WO | 2010/080237 | 7/2010 |
| WO | 2010/143902 | 12/2010 |
| WO | 2012044052 | 4/2012 |

(56) References Cited

FOREIGN PATENT DOCUMENTS

| WO | 2014-198931 | 12/2014 |
|---|---|---|
| WO | 2015014813 | 2/2015 |
| WO | 2015/119430 | 8/2015 |

OTHER PUBLICATIONS

Bhagat et al, "A cost-effective and fast synthesis of nanoporous SiO2 aerogel powders using water-glass via ambient pressure drying route," Solid State Sciences 9: 628-635 (2007).

Bhagat et al., "Superhydrophobic silica aerogel powders with simultaneous surface modification, solvent exchange and sodium ion removal from hydrogels," Microporous and Mesoporous Materials 112: 504-509 (2008).

Bhagat et al., "Textural properties of ambient pressure dried water-glass based silica aerogel beads: One day synthesis," Microporous and Mesoporous Materials 96: 237-244 (2006).

Cho et al, "A Study on the Extraction of Monasil PCA using Liquid CO2," Korean Chem. Eng. Res. 50(4): 684-689 (2012). English Language Abstract included.

Dorcheh and Abbasi, "Silica aerogel; synthesis, properties and characterization," J. Mat. Proc. Tech. 199: 10-26 (2008).

Hong et al., "Synthesis of spherical silica aerogel powder by emulsion polymerization technique," J. Ceram. Proc. Res. 13(Special 1): s145-s148 (2012).

Kwon et al., "Ambient-dried silica aerogel doped with TiO2 powder for thermal insulation," Journal of Materials Science 35: 6075-6079 (2000).

Lee et al., "Synthesis of silica aerogels from waterglass via new modified ambient drying," Journal of Materials Science 37(11): 2237-2241 (2002).

Purwanto, D. and Y. Wulandari, "Effects of precursors concentration on surface area of silica aerogels synthesized via an ambient pressure drying method," The 1st International Seminar on Fundamental & Application of Chemical Engineering, pp. A017-1 to A017-4 (Nov. 3-4, 2010, Bali—Indonesia).

Yang et al., "Porous organic-inorganic hybrid aerogels based on bridging acetylacetonate," Microporous and Mesoporous Materials 187: 108-113 (2014).

Rao et al., "Effect of precursors, methylation agents and solvents on the physiochemical properties of silica aerogels prepared by atmospheric pressure drying method," Journal of Non-Crystalline Solids 296: 165-171 (2001).

Rao et al., "Effect of protic solvents on the physical properties of the ambient pressure dried hydrophobic silica aerogels using sodium solicate precursor," Journal of Porous Materials 15: 507-512 (2008).

Ren et al., "Fabrication of silica aerogel micro cylinder for ICF target," Journal of Functional Materials 37: 834-836 (2006). English Language Abstract included on last page.

Schwertfeger et al., "Hydrophobic waterglass based aerogels without solvent exchange or supercritical drying," Journal of Non-Crystalline Solids 225: 24-29 (1998).

Sinko et al., "Nanostructure of Gel-Derived Aluminosilicate Materials," Langmuir 24: 949-956 (2008).

Sinko, "Influence of Chemical Conditions on the Nanoporous Structure of Silicate Aerogels," Materials 3: 704-740 (2010).

Wei et al., "Rich photoluminescence emission of SnO2—SiO2 composite aerogels prepared with a co-fed precursor sol-gel process," Journal of the Chinese Institiute of Chemical Engineers 38: 477-481 (2007).

Xu et al., "Preparation and characterization of silica-titania aerogel-like balls by ambient pressure drying," Journal of Sol-Gel Science and Technology 41: 203-207 (2007).

XP-002782924, Database WPI Week 200578, AN2005-762993, Thomson Scientific—Summary of Application No. JP20040126923, published as JP2005305336 (2017).

Office Action dated Sep. 3, 2020 for corresponding U.S. Appl. No. 15/755,513, 20 pages.

Office Action dated Aug. 24, 2020 for corresponding Chinese Application No. 20178003199.5, 7 pages.

Examination Report dated Oct. 12, 2020 for corresponding European Application No. 17 849 173.4, 4 pages.

Final Office Action for corresponding U.S. Appl. No. 15/755,513 dated Mar. 22, 2021, 10 pages.

Office Action for corresponding Chinese Application No. 201780008534 dated Jan. 14, 2021, 7 pages.

Final Office Action issued in corresponding U.S. Appl. No. 15/755,513 dated Nov. 26, 2021.

* cited by examiner

METHOD FOR PRODUCING SILICA AEROGEL AND SILICA AEROGEL PRODUCED THEREBY

CROSS-REFERENCE TO RELATED APPLICATIONS

This application is a National Stage Application of International Application No. PCT/KR2017/010004 filed on Sep. 12, 2017, which claims priority to and the benefit of Korean Patent Application No. 10-2016-0117519, filed on Sep. 12, 2016, and Korean Patent Application No. 10-2017-0115904, filed on Sep. 11, 2017, in the Korean Intellectual Property Office, the disclosure of which is incorporated herein in its entirety by reference for all purposes as if fully set forth herein.

TECHNICAL FIELD

The present invention relates to a method for producing a silica aerogel and a silica aerogel produced thereby.

BACKGROUND ART

An aerogel is a superporous, high specific surface area ($\geq 500$ m$^2$/g) material having a porosity of about 90 to 99.9% and a pore size in the range of 1 to 100 nm, and is a material excellent in ultra-light weight, super thermal insulation, ultra-low dielectric, and the like. Accordingly, research on the development of aerogel materials as well as research on the practical use thereof as transparent insulation materials, environmentally friendly high temperature insulation materials, ultra-low dielectric thin films for highly integrated devices, catalysts and catalyst carriers, electrodes for supercapacitors, and electrode materials for seawater desalination have been actively studied.

The biggest advantage of the aerogel is that the aerogel has a super-insulation exhibiting a thermal conductivity of 0.300 W/m·K or less, which is lower than that of an organic insulation material such as conventional Styrofoam, and that fire vulnerability and the occurrence of harmful gases in case of fire which are fatal weaknesses of the organic insulation material can be solved.

In general, the aerogel is produced by producing a hydrogel from a silica precursor such as water glass and alkoxysilane series (TEOS, TMOS, MTMS, etc.), and removing a liquid component inside the hydrogel without destroying a microstructure. The typical form of a silica aerogel may be classified into three types, i.e., powder, granule, and monolith, and the silica aerogel is generally produced in the form of powder.

Meanwhile, when the silica aerogel absorbs moisture, the characteristics and physical properties of a gel structure are deteriorated. Therefore, in order to easily use the silica aerogel in industries, a method which is capable of permanently preventing moisture in the air from being absorbed is required. Accordingly, methods for producing a silica aerogel having permanent hydrophobicity by hydrophobizing the surface thereof have been proposed.

Accordingly, the silica aerogel is generally produced by a sol-gel method in which sol formation, hydrogel formation, aging, solvent exchange, surface modification, and drying are carried out.

However, the sol-gel method requires a very complicated process and requires much cost and time, thus deteriorating the productivity and economical efficiency of the silica aerogel. Therefore, it is required to develop a novel method for producing a silica aerogel of which physical properties are excellent and are readily controllable through a simpler process.

PRIOR ART DOCUMENT

Patent Document 1

Korean Patent Application Publication No. 10-2015-0093123 (published on Aug. 17, 2015)

DISCLOSURE OF THE INVENTION

Technical Problem

An aspect of the present invention provides a method for producing a silica aerogel of which mechanical properties are improved to enhance a specific surface area and pore characteristics, and physical properties are readily controllable by using a two-step process, which includes a nucleation step of forming silica colloid particles by using a low-concentration silica precursor and a growth step of further adding a relatively high-concentration silica precursor to grow a silica wet gel by using the silica colloid particles as a seed.

Another aspect of the present invention provides a silica aerogel produced by the above-described method.

Technical Solution

An aspect of the present invention provides a method for producing a silica aerogel, the method including the steps of: 1) adding an acid catalyst and a first water glass solution to a reactor to prepare a water glass dispersion solution for forming silica colloid particles; 2) adding a surface modifier solution to the water glass dispersion solution for forming silica colloid particles, to form silica colloid particles; 3) mixing an acid catalyst with a second water glass solution to prepare a water glass dispersion solution for forming a silica wet gel; 4) adding the water glass dispersion solution for forming a wet gel to the reactor including the silica colloid particles, to form a silica wet gel; and 5) drying the silica wet gel.

According to another aspect of the present invention, there is provided a silica aerogel produced by the above-described method.

Advantageous Effects

A method for producing a silica aerogel according to the present invention uses a two-step process of a nucleation step of forming silica colloid particles and a growth step of forming a silica wet gel by using the silica colloid particles as a seed, and is thus capable of forming a silica aerogel of which mechanical stability is improved to enhance specific surface area and pore characteristics.

In addition, there is an effect in that gelation, solvent exchange, and surface modification may be simultaneously performed during a single step, and thus the production time is shortened to provide excellent productivity and economical efficiency.

In addition, there is an effect that the physical properties of a silica aerogel may be controlled by adjusting the concentration of a silica precursor to be added in each step.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In general, in the production of a silica aerogel, drying technology for removing a solvent while maintaining a pore structure without any change and mass production technology having economical efficiency are the most essential technologies.

A silica wet gel produced by using water glass is shaped such that pores thereof are filled with water which is a solvent. Simply drying and removing the solvent, causes a pore structure to easily shrink and crack due to a solvent extraction rate difference and a capillary force caused by a high surface tension of water at the gas/liquid interface while the solvent in a liquid phase is vaporized to a gas phase. This leads to a reduction in surface area and a change in pore structure. Thus, in order to maintain the pore structure of the wet gel, it is necessary to exchange water having a relatively high surface tension with an organic solvent having a relatively low surface tension, and also a technique is required which is capable of washing and drying the wet gel without shrinkage while maintaining the structure of the wet gel without any change.

In addition, the dried silica aerogel maintains a low thermal conductivity just after drying, but absorbs water in the air due to the hydrophilicity of a silanol group (Si—OH) on the silica surface, so that there is a disadvantage that the nanopore structure is shrunk due to the condensation reaction of the silanol group, and the thermal conductivity gradually increases. Therefore, in order to maintain a low thermal conductivity, the surface of the silica aerogel needs to be modified to have a hydrophobicity. Accordingly, a method for modifying the surface of the silica aerogel so as to have a hydrophobicity by using a surface modifier is widely used. However, there is a problem in that a high unit price of the surface modifier and a difficulty in controlling the surface modification reaction result in poor productivity.

Therefore, many studies have been conducted on a simpler process for producing a silica aerogel by adding and synthesizing a silica precursor, a surface modifier, and an organic solvent to a single reactor.

However, the above production method has a disadvantage in that all reactants are added at once and reacted, and it is thus difficult to control the physical properties of the finally produced silica aerogel. In addition, the mechanical properties are weakened since gel formation and surface modification reaction are occur at the same time.

Accordingly, the present invention provides a silica aerogel producing method, which is excellent in productivity and economical efficiency, and by which the mechanical properties of the silica aerogel may be enhanced and the specific surface area and the pore properties are improved, so that physical properties are readily controllable.

Hereinafter, a method for producing a silica aerogel according to an embodiment of the present invention will be described in detail.

A method for producing a silica aerogel according to an embodiment of the present invention includes: 1) adding an acid catalyst and a first water glass solution to a reactor to prepare a water glass dispersion solution for forming silica colloid particles; 2) adding a surface modifier solution to the water glass dispersion solution for forming silica colloid particles to form silica colloid particles; 3) mixing an acid catalyst with a second water glass solution to prepare a water glass dispersion solution for forming a silica wet gel; 4) adding the water glass dispersion solution for forming a wet gel to the reactor containing the silica colloid particles to form a silica wet gel; and 5) drying the silica wet gel.

Step 1) according to an embodiment of the present invention is a step of preparing a water glass dispersion solution for forming silica colloid particles, and may be specifically a step of adding the acid catalyst and the first water glass solution to the reactor.

The reactor may be a reactor having a stirrer, and the reaction may be performed while stirring. The stirring is not particularly limited, but may be performed, for example, at a speed of 50 rpm to 700 rpm, and the temperature in the reactor may be maintained at 25° C. to 95° C.

The acid catalyst is mixed with silicon dioxide in the water glass solution in the water glass dispersion solution for forming silica colloid particles, and serves to hydrate the silica precursor from a low pH. In addition, the acid catalyst may serve to react with a surface modifier in a surface modifier solution to be described later and to activate the decomposition of the surface modifier. Accordingly, the surface modification reaction is improved and the generation of ammonia is promoted to raise pH, so that the condensation reaction may occur from the hydrated water glass to induce the formation of silica colloid particles.

The acid catalyst may be at least one selected from the group consisting of nitric acid, hydrochloric acid, sulfuric acid and hydrofluoric acid, and specifically may be nitric acid, wherein the acid catalyst may be added in a molar ratio of 1 to 5, compared to the silicon dioxide in the first water glass solution. By adding the acid catalyst, the water glass dispersion solution for forming silica colloid particles may be formed to have the condition of an acidity (pH) being 0 to 4.

The first water glass solution may be a diluted solution which is a mixture obtained by adding distilled water to water glass, and the water glass may be sodium silicate ($Na_2SiO_3$), which is an alkali silicate salt obtained by meting silicon dioxide ($SiO_2$) and alkali.

The first water glass solution may contain 0.01 to 2 wt % of silicon dioxide ($SiO_2$). When silicon dioxide in the first water glass solution is contained in an amount lower than the above range, silica colloid particles are not properly formed or the number of the formed particles may be too small to appropriately play a role of a seed for the silica wet gel. When silicon dioxide in the first water glass solution is contained in an amount higher than the above range, the silica wet gel is immediately formed without forming the silica colloid particles serving as the seed, so that it is difficult to apply the production method of the present invention in which the two-step process of nucleation and growth are performed.

Step 2) according to an embodiment of the present invention, which is a step of forming silica colloid particles, may be a nucleation step. Silica colloid particles are formed by adding the surface modifier solution to the water glass dispersion solution for forming silica colloid particles and carrying out a reaction.

Generally, in the case of mixing a water glass solution, an acid catalyst, and a surface modifier solution, a network structure may be formed from a silica precursor material so that a gelation forming the silica wet gel may be initiated.

Here, the network structure may be a planar mesh structure in which specific polygons having one or more types of atomic arrangement are linked to each other, or a structure in which specific polyhedrons share their vertices, edges, faces, etc., with each other to form a three dimensional skeleton structure.

However, since the first water glass solution added in step 1) of the present invention is extremely low in concentration, only the silica colloid particles may be formed without gelation which is finally caused by the reaction between the acid catalyst and the surface modifier solution.

The silica colloid particles indicate dispersed silica fine particles which are larger than normal molecules or ions and have a diameter of about 1 nm to 1000 nm. In the production method of the present invention, the silica colloid particles may serve as a seed for producing a silica aerogel which is a final product.

Thereafter, the silica precursor and the acid catalyst are further added at a relatively high concentration, and thus the silica wet gel may be grown by using the silica colloid particles as a seed to strengthen mechanical and structural stability of the finally-produced silica aerogel.

The surface modifier solution may be produced by adding the surface modifier to a nonpolar organic solvent and then mixing. In this case, the concentration of the surface modifier in the surface modifier solution may be 0.1 to 4 M. That is, the surface modifier solution may be produced by adding 0.1 to 4 M of the surface modifier to the nonpolar organic solvent and then mixing.

The surface modifier may be at least one selected from the group consisting of trimethylchlorosilane (TMCS), hexamethyldisilazane (HMDS), methyltrimethoxysilane, trimethylethoxysilane, ethyltriethoxysilane, and phenyltriethoxysilane, and more specifically, may be hexamethyldisilazane (HMDS).

The nonpolar organic solvent may be at least one selected from the group consisting of hexane, heptane, toluene and xylene.

In addition, the surface modifier solution may be added in an amount such that the molar ratio of the surface modifier to the silicon dioxide in the first water glass solution becomes 0.05 to 20, more preferably 0.5 to 10. When the surface modifier solution is added in an amount such that the molar ratio is less than 0.05, the amount of the surface modifier capable of reacting with a silanol group (Si—OH) is relatively smaller than the amount of the silanol group (Si—OH) in the water glass solution, thereby causing silica colloid particles not to be readily formed and the surface modification reactivity to be lowered. Therefore, the silanol group which is not surface-modified during drying involves in a condensation reaction, so that the pore size of the finally produced silica aerogel may become small, and a porous structure may not be achieved. In addition, when the surface modifier solution is added in an amount such that the molar ratio is more than 20, there exists a large amount of residual surface modifiers not participating in the surface modification reaction, so that expensive surface modifier may be wasted and economical efficiency may thus be poor.

Step 3) according to an embodiment of the present invention is a step of preparing a water glass dispersion solution for forming a silica wet gel, wherein the water glass dispersion solution may be prepared by adding the second water glass solution to the acid catalyst.

The acid catalyst acts the same role as the acid catalyst used in step 1), which may have the same or different types and concentrations.

The second water glass solution may contain 1-11 wt % of silicon dioxide ($SiO_2$). When silicon dioxide in the second water glass solution is contained in an amount lower than the above range, a silica precursor may be insufficient to be difficult to grow into the silica wet gel by using the previously produced silica colloid particles as a seed. When the silicon dioxide is contained in an amount higher than the above range, the pore structure of the produced silica wet gel may be reduced, and thus the specific surface area may be excessively lowered.

Step 4) according to an embodiment of the present invention, which is a step of forming the silica wet gel, may be a growth step of growing silica colloid particles into a silica wet gel. Specifically, the silica wet gel may be prepared by reacting with the water glass dispersion solution for forming a silica wet gel added to the reactor.

Specifically, when the water glass dispersion solution for forming a silica wet gel is added to the reactor including a surface modifier solution and silica colloid particles, the gelation, solvent exchange, and surface modification reaction may be simultaneously performed. Accordingly, the production method of the present invention has a short production time, and thus the productivity and the economical efficiency may be excellent.

Specifically, when the water glass dispersion solution for forming a silica wet gel hydrated by the acid catalyst is added to the reactor including silica colloid particles under neutral or basic conditions, the pH of the water glass dispersion solution for forming a silica wet gel is raised to neutral or basic conditions to lead to the gelation. Further, the decomposition of the surface modifier which does not react in the reaction for forming silica colloid particles may be additionally activated, thereby growing the surface-modified silica wet gel by using silica colloidal particles as a seed.

In addition, the solvent exchange of the silica wet gel may be performed by the nonpolar organic solvent included in the surface modifier solution, and at the same time, the surface modification reaction of the silica wet gel may be promoted.

When gelation and surface modification are simultaneously performed as described above, the efficiency of the surface modification is higher than that in the case in which surface modification is performed subsequently after gelation. Thus, there may be another advantage in that a silica aerogel having high hydrophobicity may be produced.

Therefore, in step 4), the silica wet gel is grown by using the previously produced silica colloid particles as a seed, and at the same time, solvent exchange and surface modification may be performed to form a hydrophobic silica wet gel.

In addition, in order to produce the mechanically-stabilized silica aerogel of the present invention as described above, silica colloid particles serving as a seed are produced from a low-density silica precursor, and then a high-density silica precursor is added thereto to form a silica wet gel by using silica colloid particles as a seed. Therefore, in order to form a silica aerogel having the improved mechanical and structural stability, the concentration ratio of the silicon dioxide in the first water glass solution for preparing a water glass dispersion solution for forming silica colloid particles with respect to the silicon dioxide in the second water glass solution for preparing a water glass dispersion solution for forming a silica wet gel is required to be controlled in an appropriate range.

AS described above, specifically, the concentration of the silicon dioxide in the second water glass solution is equal to or larger than the concentration of the silicon dioxide in the first water glass solution, and more specifically, the silicon dioxide in the first water glass solution and the second water glass solution may be adjusted such that the concentration ratio therebetween becomes 1:1 to 1:1100, specifically 1:1 to 1:100, more specifically 1:1 to 1:50. When the concentration of the second water glass solution is lower than the above range, the silica wet gel may not be grown; and when the concentration of the second water glass solution is higher than the above range, the total amount of silica becomes higher than the proportion of silica colloid particles, and thus the pore fraction of the finally formed silica aerogel may be reduced.

According to the present invention, a silica aerogel is produced through the two steps, i.e., the nucleation step of forming silica colloid particles and the growth step of forming a silica wet gel by using the silica colloid particles as a seed. Thus, the silica aerogel having more mechanical stability and more excellent physical properties such as a pore characteristic, a specific surface area, and a tap density may be produced in comparison with the conventional method for producing a silica aerogel by adding the silica precursor at a time. Also, the physical properties of the finally produced silica aerogel such as a tap density, a specific surface area, the volume and size of pores, and a carbon content depending on the surface-modified fraction may be easily controlled by adjusting the concentration ratio between the water glass solutions serving as silica precursors to be added in respective steps.

Meanwhile, the production method of the present invention may further include a step of adding ammonium hydroxide during step 4) in order to further promote the galation and the surface modification reaction.

Specifically, the ammonium hydroxide may be added after the total amount of the surface modifier solution used in the reaction is added to the reactor, and more specifically, the ammonium hydroxide may be involved in the reaction by being added at a time when the pH in the reactor reaches 5 to 10 after the total amount of the surface modifier solution is added to the reactor, or may be involved in the reaction by being added after the solvent exchange is completed.

In this case, the time when the pH reaches the above range may vary with the concentration of silicon dioxide in the second water glass solution. For example, when the concentration of silicon dioxide in the second water glass solution is 3 to 8 wt %, the time may be 30±3 minutes just after the total amount of the surface modifier solution is added to the reactor.

In addition, the time when the solvent exchange is completed indicates a time when the liquid filling pores in the silica wet gel is exchanged with an organic solvent used in water, and may be observed from whether the silica wet gel is dispersed or not when the silica wet gel generated during the reaction is extracted and placed into a water phase or an organic solvent phase.

In addition, the added amount of the ammonium hydroxide is not particularly limited as long as the gelation and the surface modification reaction may be readily carried out without causing problems due to other additional reactions. However, for example, the ammonium hydroxide may be added in an amount such that the pH in the reactor after the addition of ammonium hydroxide is increased by 5% to 57% of the pH in the reactor before the addition thereof. For instance, when the pH in the reactor before the addition of the ammonium hydroxide is 7, the ammonium hydroxide may be added in an amount such that the pH in the reactor becomes 7.35 to 11.

Specifically, the ammonium hydroxide may be added, within an amount adjustable to meet the pH range above, in an amount such that the molar ratio of the ammonium hydroxide to the silicon dioxide in the second water glass solution becomes 0.5 to 25.

As described above, the production method according to an embodiment of the present invention may improve the surface modification reaction by further adding ammonium hydroxide during the reaction of step 4) and involving in the reaction. Thus, the silica aerogel having high hydrophobicity may be produced without using a large amount of the expensive surface modifier.

In step 5) according to an embodiment of the present invention, a step of drying a silica wet gel may be performed to form a silica aerogel.

In this case, the production method according to an embodiment of the present invention may further include performing a washing step before the drying step. The washing, which is for removing impurities (sodium ions, unreacted substances, by-products, etc.) generated during the reaction to obtain a hydrophobic silica aerogel with high purity, may be performed through a dilution process or an exchange process using a nonpolar organic solvent.

Specifically, the dilution process may indicate a solvent dilution process, and may be a process in which a nonpolar organic solvent may be further added to the reactor after the reaction of step 4) to allow the excessive amount of the nonpolar organic solvent to be present in the reactor.

In addition, the exchange process may indicate a solvent exchange process, and may be a process in which steps of discharging an aqueous solution layer in the reactor after the reaction of step 4), then introducing the nonpolar organic solvent, and discharging again the separated aqueous solution layer are repeatedly performed.

More specifically, the production method according to an embodiment of the present invention may be performed by additionally adding the nonpolar organic solvent to the silica wet gel, and then stirring the resultant mixture for 20 minutes to 1 hour.

The drying step in the production method according to an embodiment of the present invention may be performed by a supercritical drying process or an ambient drying process, and more specifically, may be performed by using the ambient drying process under the conditions of a temperature of 100 to 190° C. for 1 hour to 4 hours.

Thus, the production method according to an embodiment of the present invention is advantageous in that there is no need of an expensive high-pressure apparatus, and drying may thus be performed for a shorter time within 6 hours at a lower production cost than as in case of using the conventional supercritical process, thereby improving the productivity and economical efficiency of the silica aerogel.

Meanwhile, the ambient drying process may be disadvantageous in that the pore structure is easily shrunk and cracked due to a high capillary force and a difference in solvent extraction speed. However, the silica aerogel produced by the production method of the present invention may have particularly enhanced mechanical properties, and thus the wet gel may be dried without shrinkage while maintaining the structure of the wet gel without any change. Accordingly, there is a significance in that the disadvantage of the ambient drying process may be solved.

In addition, the present invention provides a hydrophobic silica aerogel produced by the production method.

The hydrophobic silica aerogel according to an embodiment of the present invention is characterized by having a specific surface area of 600 $m^2/g$ to 1,000 $m^2/g$, and the hydrophobic silica aerogel may have a tap density of 0.03 to 0.4 g/ml.

As described above, in the method for producing a silica aerogel according to an embodiment of the present invention, a silica aerogel is produced by a two-step process including a nucleation step of forming silica colloid particles and a growth step of forming a silica wet gel by using the silica colloid particles as a seed, so that the silica aerogel of the present invention may have more mechanical stability and more excellent physical properties such as a pore characteristic, a specific surface area, and a tap density in comparison with that of the conventional method in which a silica aerogel is produced by adding the silica precursor at a time. Also, the physical properties of the finally produced silica aerogel such as a tap density, a specific surface area, the volume and size of pores, and a carbon content depending on the surface-modified fraction may be easily controlled by adjusting the concentration ratio between the water glass solutions serving as silica precursors to be added in respective steps. Therefore, this method is expected to be widely used in the related industrial fields.

Hereinafter, examples of the present invention will be described in detail so that those skilled in the art can easily carry out the present invention. The present invention may, however, be embodied in many different forms and is not limited to the examples set forth herein.

EXAMPLE 1

1.5 g of a nitric acid was previously prepared in a beaker, and a 0.5 wt % of a first water glass solution (1.7 g of water glass) is added in a volume of 100 ml to prepare a water glass dispersion solution for forming silica colloid particles. The dispersion solution was then added to a reactor at 55° C. and stirred to maintain the temperature.

Thereafter, a surface modifier solution, which was obtained by adding 10 g of hexamethyldisilazane (HMDS) to 200 ml of n-hexane and stirring, was added into the reactor and reacted to produce silica colloid particles.

6.5 g of a nitric acid was previously prepared in another beaker, and a 4 wt % of a second water glass solution (12.4 g of water glass) is added in a volume of 100 ml to prepare a water glass dispersion solution for forming a silica wet gel.

The water glass dispersion solution for forming a wet gel is added to the reactor including the silica colloid particles and causing a reaction to grow the silica wet gel.

After initiation of the reaction, the silica wet gel in an aqueous solution layer was surface-modified and floated onto the top of the organic solvent layer of n-hexane. Then, in order to adjust the degree of surface modification, 3 ml of ammonium hydroxide was added at 30 minutes after the addition of the water glass solution for forming a wet gel surface modifier solution. When the surface modification was completed and a hydrophobic silica wet gel was completely floated onto the organic solvent layer of the n-hexane, 400 ml of n-hexane was further added, and then the aqueous solution layer remaining in the lower portion of the reactor was discharged through an outlet of the reactor.

After 2 hours, the silica wet gel dispersed in an n-hexane layer was completely dried in a forced convection oven at 150° C. for 6 hours to produce a hydrophobic silica aerogel.

EXAMPLES 2 to 5

Silica aerogels were produced in the same manner as in Example 1, except that first and second water glass solutions, and a nitric acid were used in respective amounts described in Table 1 below.

COMPARATIVE EXAMPLE 1

Silica aerogels were produced in the same manner as in Example 1, except that 8 g of a nitric acid, 4.5 wt % of a water glass solution (14.1 g of water glass), and a surface modifier solution were added at a time.

COMPARATIVE EXAMPLES 2 to 5

Silica aerogels were produced in the same manner as in Example 1, except that first and second water glass solutions and a nitric acid were used in respective amounts described in Table 1 below.

EXPERIMENTAL EXAMPLE 1

Tap Density Measurement

For comparative analysis of physical properties of hydrophobic silica aerogels produced in Examples 1 to 5 and Comparative Examples 1 to 5, the tap density (g/ml) and the specific surface area (BET, $m^2/g$) of each aerogel were measured, and the results were shown in Table 1 below.

1) Tap Density (g/ml)

Tap density was measured by using a tap density measuring instrument (STAV II, Engelsman AG). Specifically, each of the aerogels was placed into a standardized cylinder (25 ml) and weighted, then the cylinder was fixed to the tap density measuring instrument, a noise damping hood was closed, and 2500-times tapping was set. After the tapping measurement, the volume of each aerogel in the cylinder was measured, and a ratio of the previously measured weight to the above volume was calculate to measure the density.

2) Specific surface area (BET, $m^2/g$)

The specific surface area was analyzed by the adsorption/desorption amount of nitrogen according to partial pressure ($0<p/p_0<1$) by using a 3FLEX apparatus (Micrometrics Company).

Specifically, 100 mg of each aerogel was placed in a cylinder and pretreated at 200° C. for 8 hours, and then measured by using a specific surface area measuring apparatus.

TABLE 1

| | Nucleation step | | Growth step | | | | |
| --- | --- | --- | --- | --- | --- | --- | --- |
| | Silicon dioxide (wt %) | Nitric acid (g) | Silicon dioxide (wt %) | Nitric acid (g) | Surface modifier (g) | Tap density (g/ml) | BET ($m^2/g$) |
| Comparative Example 1 | 4.5 | 8 | — | — | 10 | 0.112 | 589 |
| Comparative Example 2 | 0.005 | 1.5 | 4.445 | 6.5 | 10 | 0.118 | 557 |
| Comparative Example 3 | 2.1 | 1.5 | 2.4 | 6.5 | 10 | 0.231 | 327 |

TABLE 1-continued

|  | Nucleation step | | Growth step | | | | |
| --- | --- | --- | --- | --- | --- | --- | --- |
|  | Silicon dioxide (wt %) | Nitric acid (g) | Silicon dioxide (wt %) | Nitric acid (g) | Surface modifier (g) | Tap density (g/ml) | BET (m²/g) |
| Comparative Example 4 | 0.5 | 1.5 | 0.5 | 6.5 | 10 | 0.283 | 225 |
| Comparative Example 5 | 0.5 | 1.5 | 12 | 6.5 | 10 | 0.320 | 232 |
| Example 1 | 0.5 | 1.5 | 4 | 6.5 | 10 | 0.113 | 684 |
| Example 2 | 0.1 | 1.5 | 4.4 | 6.5 | 10 | 0.107 | 653 |
| Example 3 | 0.2 | 1.5 | 4.3 | 6.5 | 10 | 0.105 | 672 |
| Example 4 | 1 | 1.5 | 3.5 | 6.5 | 10 | 0.115 | 621 |
| Example 5 | 1.5 | 1.5 | 3 | 6.5 | 10 | 0.114 | 625 |

As shown in Table 1, it may be ascertained that as compared with the hydrophobic silica aerogel of Comparative Example 1 in which the same amount of silica precursor as in Example was added, the hydrophobic silica aerogel of Examples to 5 produced by the production method according to an embodiment of the present invention exhibited a high specific surface area as a whole while maintaining the tap density in the same or similar level.

In addition, it can be seen that even if the silica precursor was added in two steps as in the present invention, when the concentrations of the first and second water glass solutions fall outside the numerical range of the present invention as in Comparative Examples 2 to 4, the effect of improving the tap density and specific surface area is not good.

This is because an excessively low concentration of the first water glass causes the silica colloid particles not to be formed properly or the number of formed particles to be too small to properly serve as a seed of the silica wet gel, and an excessively high concentration of the first water glass causes the silica wet gel to be immediately formed instead of forming the silica colloid particles serving as a seed, which is not different from a one-step adding process.

In addition, this is because an excessively low concentration of the second water glass solution causes the silica precursor to be insufficient and the colloid particles to be used as a seed to hardly grow the silica wet gel, and an excessively high concentration of the second water glass solution causes the pore structure of the produced silica wet gel to reduce and the specific surface area to excessively lower.

The above results show that the silica aerogel was produced by a two-step process of a nucleation step of forming silica colloid particles by using a low-concentration silica precursor in the specific range of the present invention and a growth step of forming a silica wet gel by using the silica colloid particles as a seed by adding a relatively high-concentration silica precursor, so that the mechanical stability was improved and the pore characteristics was improved.

The foregoing description of the present invention has been presented for purposes of illustration. It will be understood by those skilled in the art that various changes in form and details may be made therein without departing from the spirit and scope of the invention. It is therefore to be understood that the above-described embodiments are illustrative in all aspects and not restrictive.

The invention claimed is:

1. A method for producing a silica aerogel, comprising:
    1) adding an acid catalyst and a first water glass solution to a reactor to prepare a water glass dispersion solution for forming silica colloid particles;
    2) adding a surface modifier solution to the water glass dispersion solution for forming silica colloid particles, to form the silica colloid particles;
    3) mixing an acid catalyst with a second water glass solution to prepare a water glass dispersion solution for forming a silica wet gel;
    4) adding the water glass dispersion solution for forming the silica wet gel to the reactor including the silica colloid particles to form the silica wet gel; and
    5) drying the silica wet gel; wherein the first water glass solution and the second water glass solution contain a silicon dioxide.

2. The method of claim 1, wherein a concentration of the silicon dioxide in the second water glass solution is equal to or greater than a concentration of the silicon dioxide in the first water glass solution.

3. The method of claim 1, wherein a concentration of the silicon dioxide in the first water glass solution is 0.01 to 2 wt %.

4. The method of claim 1, wherein a concentration of the silicon dioxide in the second water glass solution is 1 to 11 wt %.

5. The method of claim 1, wherein a concentration ratio of the silicon dioxide in the first water glass solution to the silicon dioxide in the second water glass solution is 1:1 to 1:1100.

6. The method of claim 1, wherein the acid catalyst in step 1) and the acid catalyst in step 3) are selected from the group consisting of nitric acid, hydrochloric acid, sulfuric acid and hydrofluoric acid.

7. The method of claim 1, wherein the surface modifier solution is a solution in which a surface modifier is added to a nonpolar organic solvent.

8. The method of claim 7, wherein the surface modifier is at least one selected from the group consisting of trimethylchlorosilane (TMCS), hexamethyldisilazane (HMDS), methyltrimethoxysilane, trimethylethoxysilane, ethyltriethoxysilane, and phenyltriethoxysilane.

9. The method of claim 7, wherein the nonpolar organic solvent is at least one selected from the group consisting of hexane, heptane, toluene, and xylene.

10. The method of claim 1, wherein the surface modifier solution is added in an amount that a molar ratio of a surface modifier to a silicon dioxide in the first water glass solution becomes 0.05 to 20.

11. The method of claim 1, wherein gelation, solvent exchange, and surface modification are simultaneously performed in step 4).

12. The method of claim 1, wherein the silica wet gel is grown by using the silica colloid particles as a seed.

13. The method of claim 1 further comprising, during step 4), a step of adding an ammonium hydroxide ($NH_4OH$).

14. The method of claim 13, wherein the ammonium hydroxide is added in an amount that a molar ratio of the ammonium hydroxide to the silicon dioxide in the second water glass solution becomes 0.5 to 25.

15. A silica aerogel produced by the method of claim 1.

* * * * *